US008286254B2

(12) United States Patent
Kraemer et al.

(10) Patent No.: US 8,286,254 B2
(45) Date of Patent: Oct. 9, 2012

(54) BEHAVIORAL LEARNING FOR INTERACTIVE USER SECURITY

(75) Inventors: Jeffrey A. Kraemer, Needham, MA (US); Debra Malver, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 1202 days.

(21) Appl. No.: 11/281,764

(22) Filed: Nov. 16, 2005

(65) Prior Publication Data

US 2007/0113270 A1     May 17, 2007

(51) Int. Cl.
*G06F 7/04* (2006.01)
(52) U.S. Cl. ............................................ 726/27; 726/30
(58) Field of Classification Search ...................... 726/27
See application file for complete search history.

(56) References Cited

U.S. PATENT DOCUMENTS

| | | | | |
|---|---|---|---|---|
| 6,092,196 A | * | 7/2000 | Reiche | 726/6 |
| 7,506,371 B1 | * | 3/2009 | Ben-Natan | 726/18 |
| 2005/0273841 A1 | * | 12/2005 | Freund | 726/1 |
| 2006/0075469 A1 | * | 4/2006 | Vayman | 726/2 |
| 2007/0078655 A1 | * | 4/2007 | Semkow et al. | 704/258 |

OTHER PUBLICATIONS

"CiscoWorks Management Center for Cisco Security Agents v4.0", Cisco Systems, Inc., Copyright 1992-2003, 3 pages, 203051/ETMG Apr. 2003, Cisco Systems, Inc., 170 W. Tasman Drive, San Jose, CA 95134.

* cited by examiner

*Primary Examiner* — Christopher Brown
(74) *Attorney, Agent, or Firm* — Fish & Richardson P.C.

(57) ABSTRACT

A system for automatically handling requests to grant or deny access to resources in a network or computer system. In a preferred embodiment of the invention a "learning mode" can be designated so that whenever a permission query is detected the system automatically supplies an answer to the query without requiring the user to make a response or take other action. The automated answer can be set so that the permission is always granted or other criteria can be used for the automated answer such as by categorizing the type of access permission and using a default response according to the category.

23 Claims, 6 Drawing Sheets

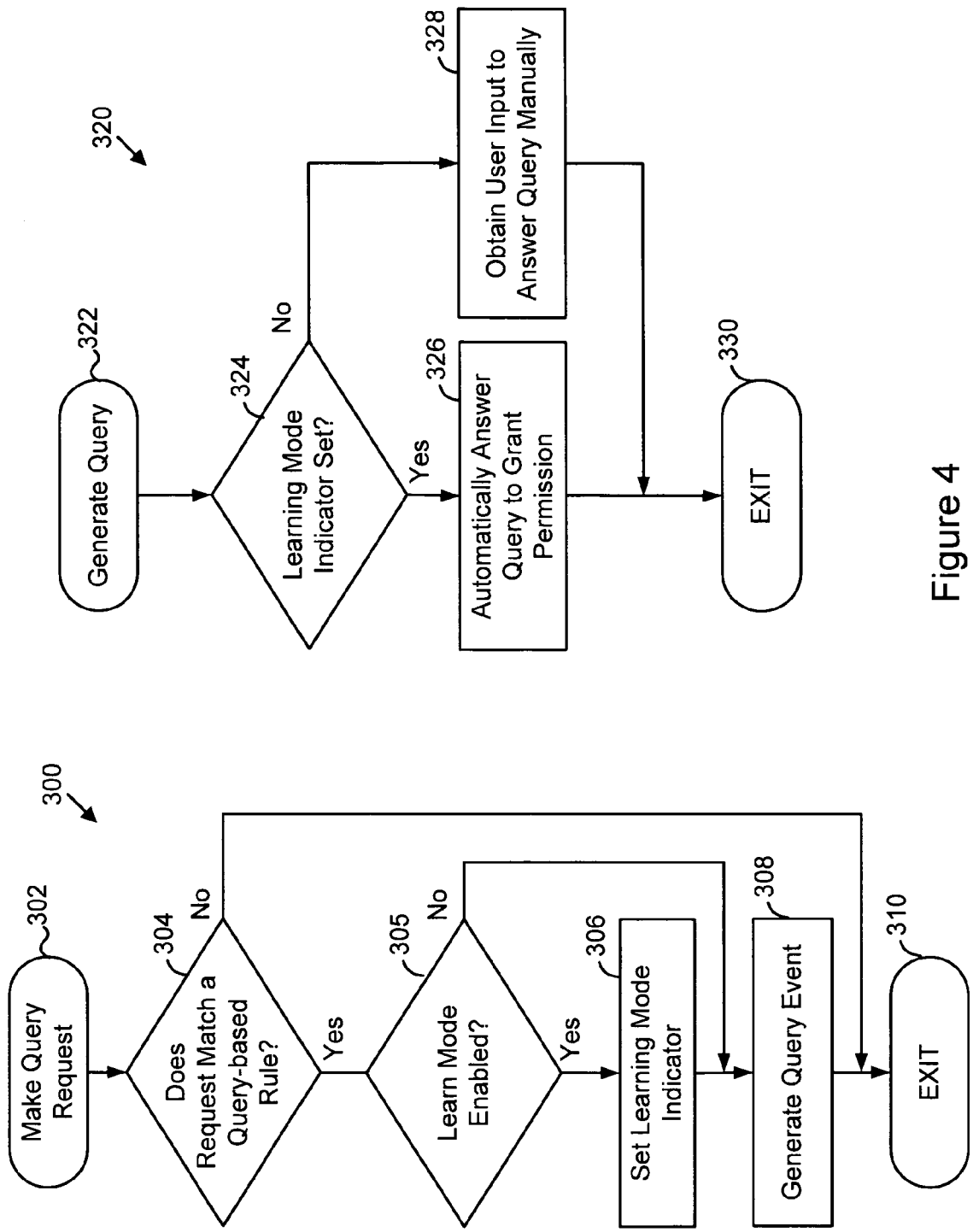

BEHAVIORAL LEARNING FOR INTERACTIVE USER SECURITY

RELATED APPLICATIONS

This application is related to U.S. patent application Ser. No. 11/046,302, filed Jan. 28, 2005, entitled "METHODS AND APPARATUS PROVIDING SECURITY FOR MULTIPLE OPERATIONAL STATES OF A COMPUTERIZED DEVICE," which is hereby incorporated by reference as if set forth in full in this document for all purposes.

BACKGROUND OF THE INVENTION

The present invention relates in general to security in digital processing systems and more specifically to a system for automated setting of access permissions in a computer network.

Security is a paramount concern for many networks. A primary goal of a network administrator is to ensure the integrity of a network, so that users of computer systems on the network are able to perform their work without interference, unwanted monitoring, or unauthorized use of the network's resources.

One common approach to enforcing network security is to define security "policies" that dictate how a human user, device or process can use various network and computer resources. For example, a security policy may require a process to obtain a cryptographic key or security ticket prior to being able to use a network shared resource such as a printer, database, input/output port, etc. Different users, devices and processes can have different types of access privileges, or rights. Each instance of an access right is an access permission that can be either granted or denied with respect to a particular resource.

One type of problem that arises in larger networks, where many users are each running many different software programs, is in the initial configuration of access permissions of the many different resources. A configuration program is used to establish rights of application programs within the network, by asking the user to specify the correct or expected behavior of each application program at a time of installing the application program or upon first executing a particular function in the application program. For example, if the application program being installed is a communication program (e.g., real-time chat function), then the configuration program would ask the user whether the communication program should have permission to communicate directly over the Internet. The permission to perform Internet accesses is obtained by first presenting the user with a query at the time of installation, such as by displaying the question "Is it ok for this program to access the Internet?" The user can set the access rights for the communication program with respect to the Internet resource by answering "yes" to grant the access permission or "no" to deny the access permission. This is an approach that is taken, for example, in products such as "ZoneAlarm" by Zone Labs of San Francisco, Calif.

Although the above approach can work well for many types of installations, it has proven to be difficult to reliably configure programs by asking each user to configure the permissions manually. This is because, for a new installation, there can be dozens of new applications that are newly installed for each of hundreds of users. Each application can have several or many questions. In practice users do not pay close enough attention to the burdensome requests for permission settings and will provide the answer that they think will result in the least amount of additional questions or difficulty. Usually this means that the will user just answer "yes" to every query. In other cases, a user may earnestly try to provide accurate and considered answers but may not be knowledgeable enough to correctly configure the access permissions. This inability of a user to correctly set access permissions can lead to improper network security or incorrect operation of application programs. User mis-configuration may require intervention by the network or system administrator or can lead to other problems.

Another approach to improving configuration of applications' permissions for network security has attempted to analyze the operating behavior of the various applications to determine what might be accepted behavior. Then, permissions are granted according to access policies set by a human administrator. However, crafting meaningful security policies for a wide variety of applications is time-consuming. In large networks there are too many applications for which to define specific policies, so network administrators tend to very broadly grant permissions. This approach is also susceptible to mistaking a malfeasant program ("malware," e.g., a virus, Trojan horse, key-logger, etc.) as a legitimate program and granting access permissions to the malware.

SUMMARY OF EMBODIMENTS OF THE INVENTION

In a preferred embodiment of the invention, a "learning mode" can be designated so that whenever a permission query to set an access permission is detected, the system automatically supplies an answer to the query without requiring the user to make a response or take other action. The automated answer can be set so that the permission is always granted or other criteria can be used for the automated answer such as by categorizing the type of access permission and using a default response according to the category.

In a preferred embodiment, the learning mode is enabled at a time of initial deployment of a networked computer system. The automated answer is always "yes" to application program queries for access while learning mode is active. After a period of time (e.g., hours or days) the learning mode is disabled (either automatically or manually). If any installed programs try to use a new resource or seek a permission that was not already established during learning mode, then the permission request is handled in a traditional manner, such as by presenting a query for the permission. In this manner, the large majority of questions will be answered by default in the learning mode when the system is initially deployed and all of the baseline software programs are installed. At installation it can be assumed with a higher degree of confidence that the system has not been infiltrated or compromised with "attacker" type of software such as a virus, worm, relay, keystroke monitoring, or other type of spyware or malware. With this approach, users are not inundated with many queries and will be more likely to pay attention and correctly answer subsequent queries that occur due to anomalies after learning mode is deactivated.

Queries, both automated and manual, can be logged for review to change parameters or policies for use by the learning mode. For example, some types of queries can be identified and provided with predefined answers other than merely to grant all permissions. An administrator can make exceptions to automated queries where, for example, certain types of queries, queries for a particular resource, queries from a particular application program, etc., can be exempted from automated answers even when in the learning mode. This allows a central administrator to correct queries which have been incorrectly answered.

In one embodiment, the invention provides a method for setting access permissions in a computer system, wherein an application executing in a computer system includes a permission query, wherein the permission query is presented to a user to obtain a response for setting an access permission, the method comprising: detecting that the permission query is being presented; and checking that a learning mode is active and, if so, then providing an automatic response to the permission query without requiring a response from a human user.

BRIEF DESCRIPTION OF THE DRAWINGS

FIG. 4 shows a first flowchart for detecting a query event and setting an indicator, and a second flowchart for generating a query.

DETAILED DESCRIPTION OF EMBODIMENTS OF THE INVENTION

Figure 1:
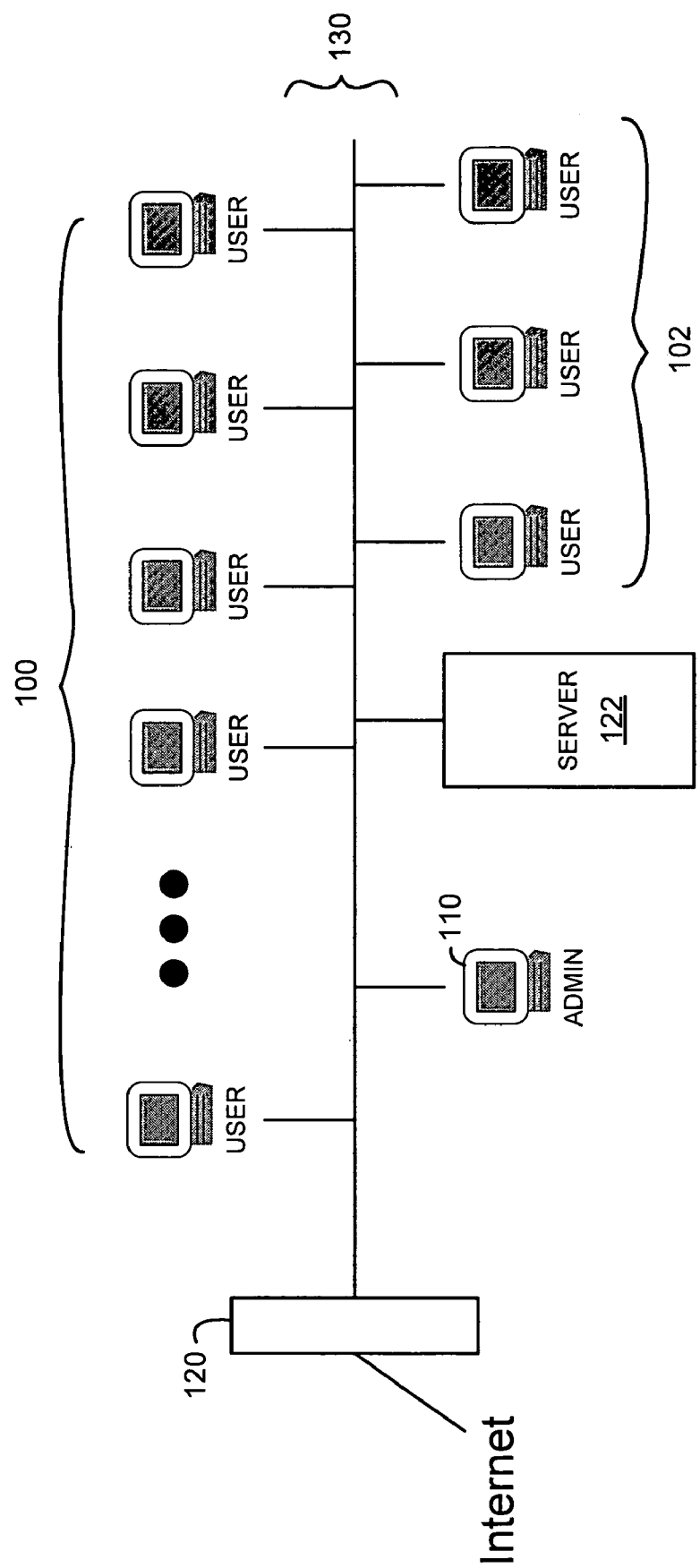
FIG. 1 illustrates a computer network.

FIG. 1 provides a basic illustration of a computer network. In FIG. 1, computers such as 100 and 102 are operated by human users (not shown). The computers are interconnected with a local area network (LAN) 130. As is known in the art, LAN 130 can include any number of computer systems and other hardware such as routers, switches, etc. Any type of communication link can be used such as hardwire, wireless, optical, etc. Standard protocols such as Ethernet, Hyper-Text Transport Protocol, etc., are popularly employed. In general, any type of suitable network architecture, devices, protocols, communication links and other designs can be used, as desired.

Each computer may be equipped with its own local resources such as a processor, display, user input device, disk drives, etc. Network resources are also available to the computers via network interconnections. A resource can include access to the file system, applications, system configuration or other data structure. A resource can also be a service such as printing, archiving, etc. Another type of resource includes actions such as use of network ports, monitoring or interception of user keystrokes, accessing system functions using programmatic API etc. In general, any useful hardware device, software process, data structure or element, or other item; or a service or action that transfers, processes, presents, handles or affects such an item can be a "resource." Access to resources (local, networked, or other) is according to an access permission that is implemented as defined by a security policy relating to a resource and/or a person, device or process that might use the resource. A collection of security policies or "rules" is often referred to as an Access Control List (ACL).

A network or system administrator is illustrated at 110. The administrator can set access policies for all domain components such as users, devices and processes within the network. The policies are centrally configured and stored in server 122. These policies are then distributed to enforcement points on machines in the network (100 and 102). Whenever an attempt to access a resource is detected by an enforcement point, the access policy is checked, with respect to the component attempting to access a resource. If the component has been granted access permission for the resource, then it is permitted to perform the operation using the resource. If not, the component is blocked from using the resource.

A preferred embodiment uses a system of software and hardware including items designed and manufactured by Cisco Systems, Inc. One part of this system includes the Cisco Security Agent (CSA). CSA includes processes for a distributed enforcement of security policies and uses a policy repository located on a centralized server, such as server 122 of FIG. 1, and Security Software which runs on every secured machine such as the user computers or clients at 100 and 102 of FIG. 1.

Server 122 acts as a Management Center (MC) for managing policies. Administrators, such as admin 110, access the functions of the MC via a web interface using a standard web browser to configure security policies in a central database. The server then distributes the relevant security policies to the Security Agents (SAs) executing on processing systems such as in desktop computers (e.g., at 100 and 102), other servers, processors, etc. of an organization for which the admin is responsible.

The Security Agent software on each individual machine is responsible for locally enforcing the specified security policy for the processing system in which it resides. Note that this distributed scheme is just one way of implementing a design of the features of the present invention. In a preferred embodiment, the decision to query the user also occurs locally on the agent. The agents send security related events back to the MC for centralized logging, report generation, and to facilitate security policy modifications. Other approaches are possible such as where functions of the SA software are performed outside of the system on which the SA software resides, such as being performed by the MC or by one or more other processing systems.

Figure 2:
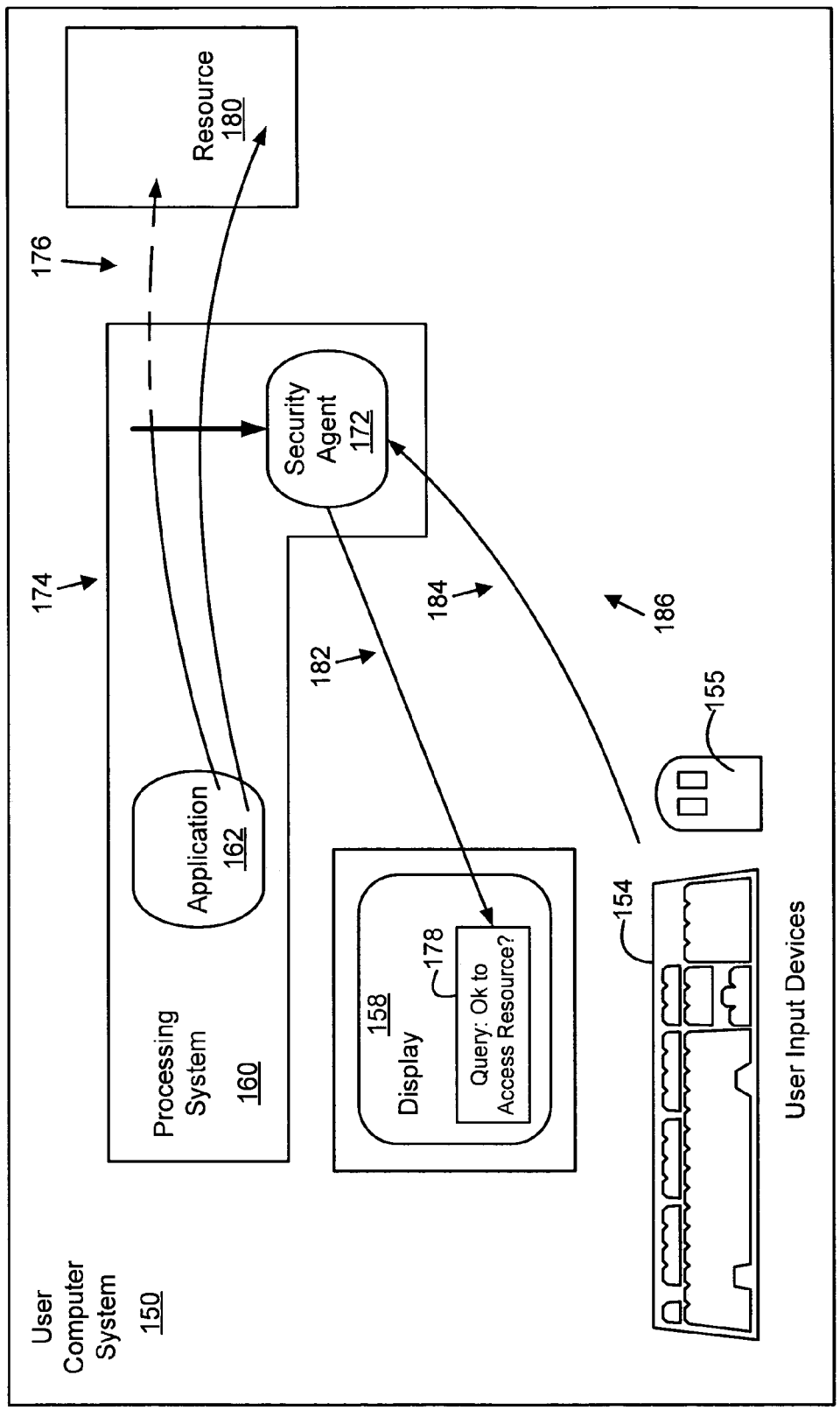
FIG. 2 is a prior art illustration of a permission query for setting an access permission.

FIG. 2 illustrates basic parts of a prior art system for setting an access permission. In FIG. 2, user computer system 150 includes processing system 160 within which executes application 162. User computer system 150 also includes display 158 and user input devices such as keyboard 154 and mouse 155. Naturally deviations are possible from the exemplary computer system shown in FIG. 2 and any number or type of components can be included in a computer system. In general, computer systems described herein, such as computer system 150, need not be a standalone "personal computer" type of system but can be any processing system such as a server, cell phone, personal digital assistant (PDA), laptop computer, audio player, etc.

Application program 162 makes request 174 to use resource 180. Resource 180 can include, for example, a data access, network connection, device, process, or other component, function or property within or outside of user computer system 150.

SA 172 detects and blocks the request so that the request is suspended from actually accessing the desired resource as shown by the broken line at 176. Upon detection of request 174 for resource 180, SA 172 generates a query message 182, which generates the permission query 178 on display screen 158. This prompts a human user to indicate acceptance (i.e., permission) or denial of the access permission associated with resource 180 and application 162. Assuming the user grants the access permission then, upon receiving an input signal 184 from a user input device, SA 172 updates a security policy to indicate the application can access the resource until the security policy is changed. Application 162's ability to now access resource 180 without further interceptor intervention is illustrated by the line at 186. Typically, the SA resides inside of processing system 160. The SA acts as the local security software runnig on machine 150 to intercept the request for accessing a resource. Often resource 180 is also within user computer system 150. For example, accessing of a file or a network resource can be initiated and detected within user computer system 150.

Figure 3A:
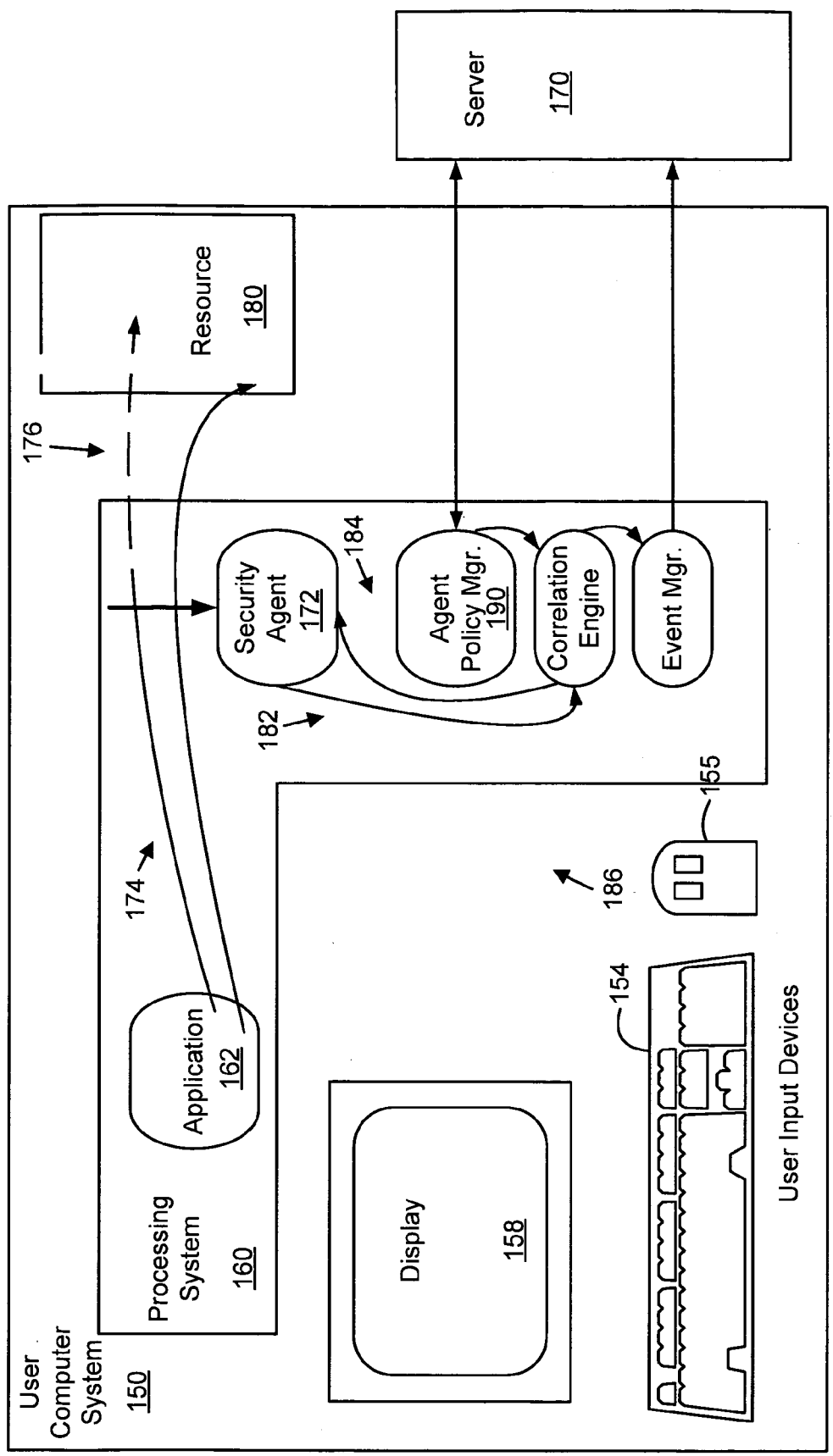
FIG. 3A shows an embodiment of the invention for automatically responding to a permission query in order to set an access permission.

FIG. 3A shows setting of an access permission according to a preferred embodiment of the invention.

In FIG. 3A, the example of the same access permission described above in connection with FIG. 2 is used. As before, application 162 makes a request for resource 180 and the request is detected and temporarily blocked by SA 172. SA 172 has an interceptor component which can intercept and control access to a resource. It communicates with policy manager 190 which performs access policy checks for the interceptors. SA 172 checks with correlation engine 194 to obtain any applicable access rules. The SA policy manager 190 sets up rules in the policy/correlation engine according to policies obtained from the server. The correlation engine checks whether a "learning mode" is active (e.g., by checking a status bit or state variable). If the learning mode is active then the permission query is prevented from being displayed on the display screen. Instead, a predetermined answer to the request is generated. In a preferred embodiment, all resource permissions that are requested while the learning mode is active are granted. Granting of the access permission is indicated in an automatic response 184 from the correlation engine to SA 172, so that application 162 is allowed to access resource 180 as shown by 186. Application 162 will remain able to access resource 180 in the future until the access permission is changed. The interceptor component of the SA must always reside locally on machine 150. In the example of FIG. 3A the policy engine is also executing locally to user computer system 150. This is the preferred embodiment, to enable "real-time" policy decision. However, different implementations can have the policy engine or other components executing on any suitable platform including executing remotely (in whole or in part). In general, functions described herein are not restricted in time or place and may be performed at different times and at different locations by one or more devices, as desired.

Event manager 196 sends notification of the response to the request to the server. Note that in other embodiments the permission query and/or answer might be displayed on display 158 or on another display or stored in additional records such as on a network administrator's computer, written to a remote log file, etc. The query could still be handled with an automatic response so that no response from the user is required. A user can be shown a short message when an automatic response has been generated. A combination of some user interaction with automated responses can also be used, as where a user is presented with a batch of automated responses and must approve them several at a time with one mouse click or keyboard response. A user might be given the ability to turn automated responses on or off in case the user decides they want to answer some user queries manually. Other variations are possible.

Figure 3B:
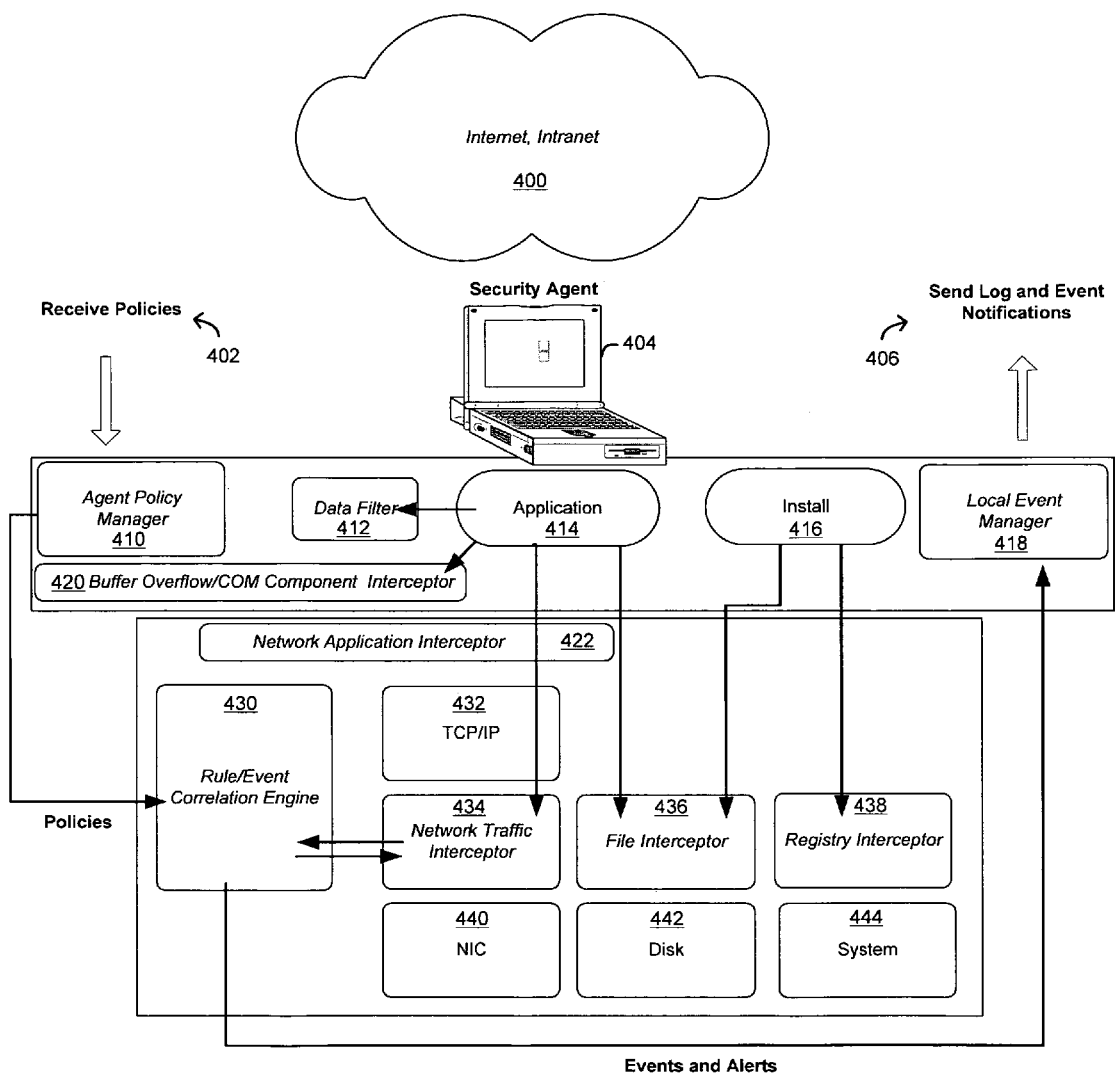
FIG. 3B shows additional details of the processes used to implement the functions described in FIG. 3A.

FIG. 3B shows additional details of the processes used to implement the functions described in FIG. 3A. In FIG. 3B, the processes execute at a client processing system, such as shown at user computer 404. User computer 404 is in communication with network 400 which allows connections to other resources and to a server computer executing an MC function.

Polices from the MC are received by Agent Policy Manager 410 and are provided to Rule/Event Correlation Engine 430. Application 414 executes within the user computer and makes a request for resources. Depending upon the request type, other processes or system level filter drivers such as Data Filter 412, Buffer Overflow/COM Component Interceptor 420, Network Application Interceptor 422, Network Traffic Interceptor 434 or File Interceptor 436 are invoked to determine how to handle the request. These interceptors communicate with Rule/Event Correlation Engine 430 to implement the steps of the flowcharts, described below, to determine the outcome of the request.

The Correlation Engine uses Access Control rules to match the access request with the appropriate rule, and to allow or deny access based upon the security policy. In addition to automatically allowing or denying access to the resource, the Correlation Engine can also delay access to the resource while it queries the local user as to what should be done. This is accomplished by sending a query event to the Local Event Manager which launches a query popup to the end user. When an answer is provided, the response (to allow or deny access) is then sent back to the "Rule Engine", in order to satisfy the pending resource request Types of resources shown in FIG. 3B include Transmission Control Protocol/Internet Protocol (TCP/IP) 432, Network Interface Card (NIC) 440, Disk drive 442, System resources 444 (e.g., registry, memory use, etc.). They are accessed by applications such as a software installer program (416) or application 414 such as a Web server application (414) The outcome of the request is noted as an event by Local Event Manger 418 and sent to the server for logging.

In a preferred embodiment, the Security Agent software is essentially a stateful reference monitor. The agent resides in both application space as well as in the kernel. Local Event Manager 418 and Agent Policy Manager 410 are application daemons which communicate with the central MC, and are responsible for uploading security events to the MC (Local Event Manager) as well as downloading security policies from the MC (Agent Policy Manager) and loading them into the kernel Rule Engine.

Figure 5:
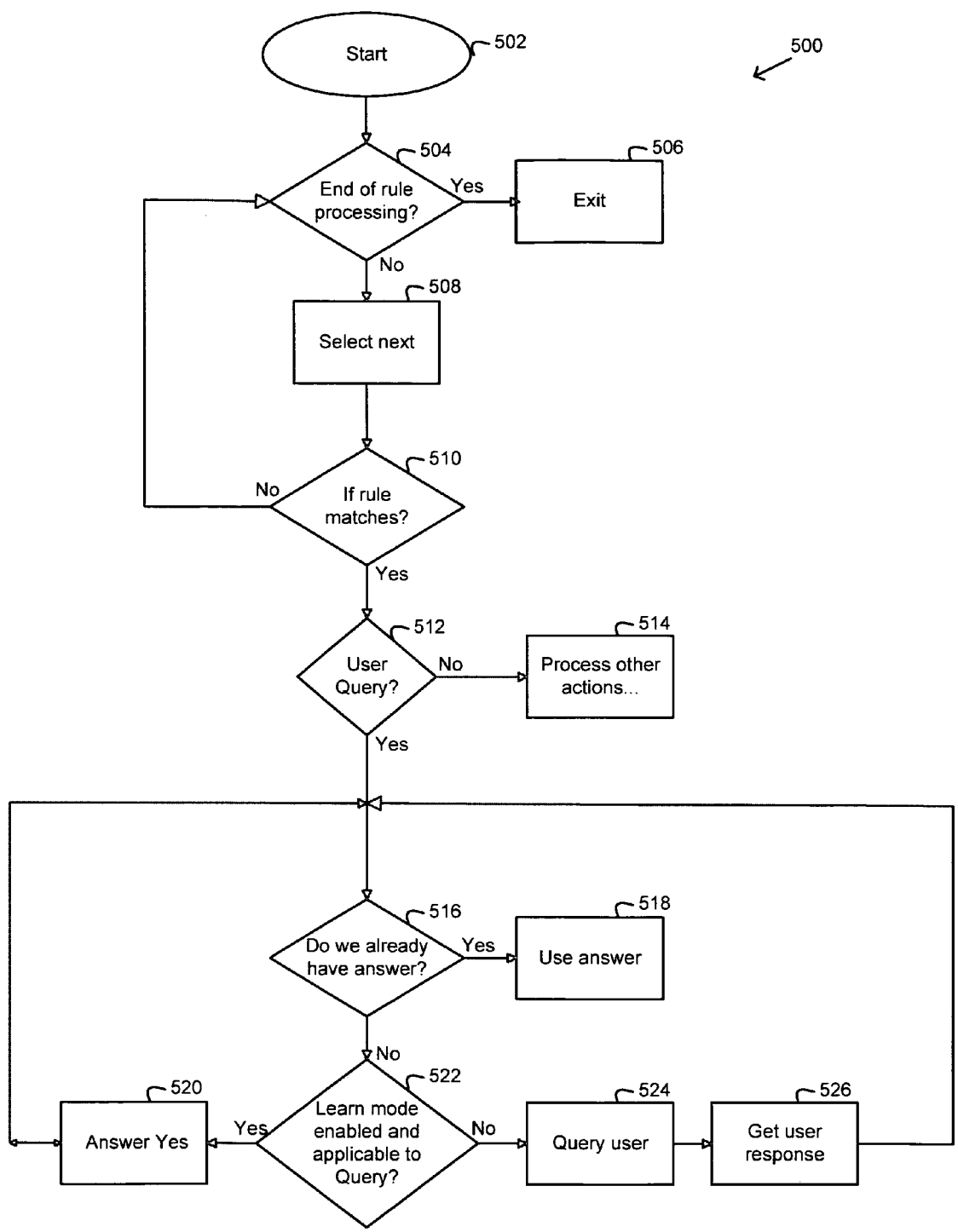
FIG. 5 shows steps of a routine in a preferred embodiment for implementing a learning mode response to a request for a resource.

FIGS. 4 and 5 show flowcharts that illustrates an overview of steps in a general design to implement the functionality described above.

FIG. 4 shows flowchart 300 that illustrates basic steps in a process that detects a query event and sets a flag for a query generation routine if in a learning mode. The process is entered at 302 when an application desires to make a resource request. At step 304 a check is made as to whether the request matches a query-based rule. If not, the routine exits at 310.

If the request matches a query-based rule at the check in step 304 then step 305 checks whether a learning mode is active. If so, step 306 is executed to set the learning mode indicator, otherwise step 306 is skipped. Then execution proceeds to step 308 where a query event is indicated.

Also shown in FIG. 4 is flowchart 320 showing basic steps in a second process that is used to generate a query. This process is modified to act on a learning mode indicator. The process of step 320 is entered at step 322. In one embodiment this process is always executing or "listening" for appropriate messages or indicators but the activity of the process is illustrated by having an entry point at 322 where it is assumed that a query generation message is received.

At step 324 a check is made as to whether a learning mode is set. If so, execution proceeds to step 326 where the process automatically provides an answer to the query event. Otherwise, step 328 is executed to allow a user to answer the query manually. The routine exits at step 330.

FIG. 5 shows additional details of a routine in a preferred embodiment for implementing a learning mode response to a request for a resource. Rules are used to control how the response is handled.

In FIG. 5, flowchart 500 is entered at step 502 when a resource request is made. Step 504 begins a loop to search for any applicable rules in the rules database. If no matching rules are found then the loop exits at step 506. Otherwise step 508 is repeatedly executed to obtain the next rule. Processing continues to step 510 to determine if the currently selected rule is applicable to the current resource request. If not, execution of the loop continues to step 504 again, otherwise execution proceeds to step 512.

At step 512 if the applicable rule is not a permission query rule that requires a user response then step 514 is executed to handle the rule. Otherwise, steps 516-526 are executed to implement an automated response to the request, if possible or to query the user if not.

At step 516 a check is made to determine if an answer to the query has already been determined (e.g., a prior permission query was answered by a user, the particular response has a default answer, the answer had been previously learned, etc.). If so, step 518 uses the known answer and execution of the routine terminates. Otherwise a check is made at step 522 as to whether learning mode is enabled for this rule. If learning mode is enabled then a default answer to the permission query is set to "yes" at step 520 and execution proceeds back to step 516 where the check to determine if there is already an answer will now be in the affirmative so the "yes" answer will be used at step 518 and the routine terminates.

Otherwise, if the check at step 522 determines that learning mode is not enabled for this query then execution proceeds to steps 524 and 526 where the user is queried and the user's response is obtained, respectively. Execution proceeds to step 516 and 418 where the user's answer is used and the routine exits.

Note that the flowcharts are merely for purposes of illustration and the functionality described by the flowcharts can be obtained in many different ways. In a preferred embodiment the implementation of the steps relating to learning mode are spread across multiple components in a client process (i.e., both the Rule Engine and Local Event Manager).

Although embodiments of the invention have been discussed primarily with respect to application program requests any type of process, routine, process, utility, tool, library routine or other entity within a computer system or network can make a resource request that is handled according to features of the invention. Can be any type of request, not just application programs. E.g., operating system, drivers, utilities, tools, library routines, etc.

Variations of the presented embodiments are possible. For example, a baseline performance can be established by the automatic answers provided while in learning mode. Thereafter, when the network devices are not in learning mode, any deviations from the baseline behavior, such as applications requesting new types of resources, can be handled by presenting users with permission queries that require manual replies. Other steps can be taken such as by alerting a network administrator, automatically denying the access request, etc.

In other embodiments automatic answers to query requests need not be simply to "grant" or "deny" an access request. Any form of permission is possible such as providing permission for a limited time, under predetermined conditions, etc. The learning mode can be enabled or disabled as desired, either remotely as by an administrator at an admin panel, locally by a user at their machine, automatically as by a process or device on a predetermined schedule or condition, etc.

The embodiments described herein are merely illustrative, and not restrictive, of the invention. For example, the network may include components such as routers, switches, servers and other components that are common in such networks. Further, these components may comprise software algorithms that implement connectivity functions between the network device and other devices.

Any suitable programming language can be used to implement the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a functional aspect of the present invention.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain and store the program for use by or in connection with the instruction execution system, apparatus, system or device. The memory can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for setting access permissions in a computer system, the computer system including a processor and a non-transitory computer readable storage medium including instructions executable by the processor, the method comprising:
   detecting a query by an application for permission to access a resource;
   searching a rules database for a rule that is applicable to the query;
   determining that the rules database contains an applicable rule;
   determining whether the applicable rule indicates whether the application is permitted to access the resource;
   responsive to determining that the applicable rule indicates whether the application is permitted to access the resource, granting or denying permission to the application to access the resource based on the applicable rule; and
   responsive to determining that the applicable rule does not indicate whether the application is permitted to access the resource:
      determining whether a learning mode is active for the applicable rule, and
      responsive to determining that a learning mode is active for the applicable rule:
         providing an automatic response to the query without requiring an input from a user, the automatic response granting or denying, based on a policy, permission to the application to access the resource, and
         automatically setting, without input from a user, the applicable rule, based on the policy, to indicate that the application is permitted or is not permitted to access the resource, and
      responsive to a determination that the learning mode is inactive for the applicable rule:
         obtaining an input from the user, the input indicating whether the application is permitted to access the resource, and
         providing a response to the query, granting or denying permission to the application to access the resource based on the input.

2. The method of claim 1, wherein the automatic response includes granting the access permission.

3. The method of claim 1, wherein the permission query includes a visual indicator.

4. The method of claim 1, wherein the permission query includes an audible indicator.

5. The method of claim 1, wherein the policy is a security policy.

6. The method of claim 2, further comprising determining that multiple user queries are presented, wherein the automatic response is preset to a default setting to always grant the access permission for all user queries.

7. The method of claim 1, further comprising:
   establishing a baseline behavior by monitoring resource requests made on the computer system; and
   generating an automatic response for the baseline behavior.

8. The method of claim 7, wherein establishing a baseline behavior includes monitoring a resource use of an application program over a predetermined time.

9. The method of claim 8, wherein using the baseline behavior includes determining when an access request of an application program is a new type of access request with respect to access requests in the baseline behavior.

10. The method of claim 9, further comprising:
storing a response for the determined access request; and
using the stored response to automatically respond to the permission query.

11. The method of claim 8, wherein the resource use includes one or more of the following: data access, internet access, memory access, a system function, a system configuration, and an application invocation.

12. The method of claim 1, wherein the learning mode is active for a predetermined time.

13. The method of claim 1, wherein at least a portion of the permission query is displayed to the user.

14. The method of claim 1, further comprising creating a record of the provided automatic responses.

15. The method of claim 1, further comprising controlling the learning mode remotely.

16. The method of claim 1, further comprising controlling the learning mode locally.

17. A computer-implemented method comprising:
determining whether a resource request matches a query-based rule, wherein the determining comprises searching for applicable rules in a rules database;
in response to determining that the resource request matches the query-based rule, determining whether a learning mode is active for the matched query-based rule;
in response to determining that the learning mode is active for the matched query-based rule:
providing an automatic response to the permission query without requiring an input from a user, the automatic response granting or denying, based on a policy, permission to the application to access the resource, and
automatically setting, without input from a user, the matched query-based rule, based on the policy, to indicate that the application is permitted or is not permitted to access the resource.

18. An apparatus for setting access permissions in a computer system, the apparatus comprising:
a processor;
a non-transitory computer readable storage medium including instructions executable by the processor for performing the following:
detecting that a permission query is being presented, wherein an application executing in a computer system includes a permission query;
matching a query-based rule to the permission query, wherein the matching comprises searching for an applicable rule in a rules database;
determining whether a learning mode is active for the matched query-based rule; and
in response to determining that the learning mode is active for the matched query-based rule:
providing an automatic response to the permission query without requiring an input from a user, the automatic response granting or denying, based on a policy, permission to the application to access the resource, and
automatically setting, without input from a user, the matched query-based rule, based on the policy, to indicate that the application is permitted or is not permitted to access the resource.

19. The apparatus of claim 18, wherein the automatic response includes granting the access permission.

20. The apparatus of claim 19, wherein the non-transitory computer readable storage medium includes instructions executable by the processor for determining that multiple user queries are presented, and
wherein the policy is to always grant permission for all user queries.

21. The apparatus of claim 18, wherein the non-transitory computer readable storage medium includes instructions executable by the processor for:
establishing a baseline behavior by monitoring resource requests made on the computer system; and
setting the policy according to the established baseline behavior.

22. A non-transitory computer readable storage medium including instructions comprising:
one or more instructions for detecting that the permission query is being presented, wherein an application executing in a computer system includes the permission query;
one or more instructions for matching a query-based rule to the permission query, wherein the matching comprises searching for applicable rules in a rules database; and
in response to matching a query-based rule to the permission query, one or more instructions for determining whether a learning mode is active for the matched query-based rule; and
in response to determining that the learning mode is active for the matched query-based rule:
providing an automatic response to the permission query without requiring an input from a user, the automatic response granting or denying, based on a policy, permission to the application to access the resource, and
automatically setting, without input from a user, the matched query-based rule, based on the policy, to indicate that the application is permitted or is not permitted to access the resource.

23. An system comprising:
a processor; and
a non-transitory computer readable storage medium including instructions executable by the processor for performing the following:
detecting a query by an application for permission to access a resource;
searching a rules database for a rule that is applicable to the query;
determining that the rules database contains an applicable rule;
determining whether a learning mode is active for the applicable rule; and
in response to determining that the learning mode is active for the applicable rule:
providing an automatic response to the query without requiring an input from a user, the automatic response granting or denying, based on a policy, permission to the application to access the resource, and
automatically setting, without input from a user, the applicable rule, based on the policy, to indicate that the application is permitted or is not permitted to access the resource.

* * * * *